United States Patent [19]

Margerum et al.

[11] 4,427,569
[45] Jan. 24, 1984

[54] SHORT LENGTH ESTER LIQUID CRYSTAL MIXTURES AND PROCESS FOR MAKING SAME

[75] Inventors: J. David Margerum, Woodland Hills; Leroy J. Miller, Canoga Park, both of Calif.

[73] Assignee: Hughes Aircraft Company, El Segundo, Calif.

[21] Appl. No.: 217,619

[22] Filed: Dec. 18, 1980

[51] Int. Cl.³ .......................... C09K 3/34; G02F 1/13
[52] U.S. Cl. .......................... 252/299.63; 252/299.64; 252/299.65; 252/299.67; 252/299.5; 350/350 R
[58] Field of Search ............ 252/299.63, 299.64, 252/299.65, 299.67, 299.5; 350/350 R

[56] References Cited
U.S. PATENT DOCUMENTS

| | | | |
|---|---|---|---|
| 3,876,286 | 4/1975 | Deutscher et al. | 252/299.67 |
| 3,953,491 | 4/1976 | Steinstrasser et al. | 252/299.64 |
| 4,001,137 | 1/1977 | Steinstrasser | 252/299.64 |
| 4,011,173 | 3/1977 | Steinstrasser | 252/299.64 |
| 4,014,811 | 3/1977 | Totani et al. | 252/299.67 |
| 4,065,489 | 12/1977 | Steinstrasser et al. | 252/299.65 |
| 4,128,312 | 12/1978 | Lim | 252/299.67 |
| 4,137,250 | 1/1979 | Reynolds | 252/299.67 |
| 4,202,791 | 5/1980 | Sato et al. | 252/299.63 |

FOREIGN PATENT DOCUMENTS

| | | | |
|---|---|---|---|
| 2353315 | 5/1974 | Fed. Rep. of Germany | 252/299.67 |
| 2854310 | 6/1979 | Fed. Rep. of Germany | 252/299.63 |
| 2934918 | 3/1980 | Fed. Rep. of Germany | 252/299.63 |
| 105701 | 5/1974 | German Democratic Rep. | 252/299.63 |
| 49-63677 | 6/1974 | Japan | 252/299.67 |
| 49-64579 | 6/1974 | Japan | 252/299.67 |
| 49-64584 | 6/1974 | Japan | 252/299.67 |
| 50-24175 | 3/1975 | Japan | 252/299.67 |
| 55-29545 | 3/1980 | Japan | 252/299.65 |
| 55-99988 | 7/1980 | Japan | 252/299.63 |
| 2017742 | 10/1979 | United Kingdom | 252/299.63 |
| 2028363 | 3/1980 | United Kingdom | 252/299.63 |

*Primary Examiner*—Teddy S. Gron
*Attorney, Agent, or Firm*—David W. Collins; W. J. Bethurum; A. W. Karambelas

[57] ABSTRACT

New nematic liquid crystal (LC) ester mixtures with relatively short average molecular lengths are made by including one or more binary sets of components which have identical, or nearly identical, molecular lengths. Undesirable solids solution phase effects are avoided by either utilizing appreciable asymmetry in the alkyl end groups or by combining LC esters of different classes.

11 Claims, No Drawings

SHORT LENGTH ESTER LIQUID CRYSTAL MIXTURES AND PROCESS FOR MAKING SAME

TECHNICAL FIELD

This invention relates, generally, to the preparation of liquid crystal mixtures and, more particularly, to the preparation of multi component liquid crystal eutectic mixtures containing short chain esters which exhibit relatively low viscosities over a wide nematic temperature range.

BACKGROUND OF THE INVENTION

1. Field of the Invention

This invention embodies a novel series of low viscosity liquid crystal mixtures wherein the components include one or more binary mixtures of two short chain ester liquid crystals of essentially equal molecular length. Liquid crystal (LC) mixtures have been used in many electro-optical (E-O) devices, in lieu of single LC compounds, in order to widen the operating temperature range of these devices and, in some instances, to improve their electro-optical characteristics.

Certain E-O devices which operate in a dynamic scattering (DS) mode, such as LC reticles and LC matrix displays, require liquid crystal mixtures which exhibit low viscosities in addition to other desirable characteristics for E-O devices such as a wide nematic range, good dopant solubilities, high conductivity anisotropy, negative dielectric anisotropy, good birefringence, colorlessness, and stability to light, heat, moisture and electrical signals. The availability of LC mixtures exhibiting appropriate combinations of these characteristics is particularly limited.

2. Description of the Prior Art

Prior art LC materials used in electro-optical devices are commonly mixtures of LC components, combined to achieve appropriate anisotropic properties and the required nematic temperature range. Often multi-component mixtures are used, and trade-off factors are involved in trying to optimize the various properties obtained from the LCs which are combined. Previously, LC mixtures were used in which all of the LC components differed in molecular length, usually by two or more methylene groups and rarely by as little as one methylene group in the total number of alkyl and alkoxyl end group carbon atoms. This sharply limited the combinations that could be used to prepare short length mixtures with wide temperature ranges and other desirable properties such as low viscosity, good dopant solubility as well as favorable anisotropic properties for device applications. LC components are chosen whose mixtures have depressed melting points (crystalline to nematic phase changes) with a minimum that generally corresponds to a eutectic mixture composition. Nematic components which strongly interact to form molecular complexes result in mixtures with a complexity of phases, and such mixtures were generally avoided for E-O devices. On the other hand, components which are too much alike can form mixtures which behave as solid solutions. These are generally not useful because the melting point range obtainable is no lower than the lowest of the pure components.

Previously, the most common method of achieving eutectic mixtures has been to combine different molecular length LC compounds from the same homologous series, i.e. combined compounds whose difference is the sum of the length of their terminal R and R' end groups. This approach has been used to obtain eutectic mixtures from many different series of LC compounds. For example, binary mixtures of 4,4'-di-n-alkoxyazoxybenzenes were studied and it was found that eutectic mixtures were obtained if "the ratio of the molecular length is equal or less than ca.0.80." (D. Demus, C. Fietkau, R. Schubert and H. Kehlen, Mol. Cryst. Liq. Cryst., B 25, 215-232 (1974). These compounds have the following structure:

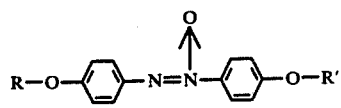

Where R is an alkyl group having from 1 to 6 carbon atoms. It can be concluded from the Demus et al studies that with $C_n$ representing the number of carbons in each of the two end groups, that the binary mixtures of $C_2/C_3$, $C_3/C_4$, $C_4/C_5$ and $C_5/C_6$ did not show good eutectic properties, while good properties were obtained from $C_1/C_2$, $C_1/C_3$, $C_1/C_4$, $C_1/C_5$, $C_1/C_6$, $C_2/C_4$, $C_2/C_5$, $C_2/C_6$, $C_3/C_6$, and $C_4/C_6$. The $C_1/C_2$ case was noted to be the only exception to the 0.8 ratio-of-lengths rule. However, even the $C_1$ and $C_2$ components differed by two carbons in length, while the other mixtures differed by 4 or more carbons in length.

When azoxy LC compounds are synthesized with alkoxy (RO) and alkyl (R') end groups, isomeric mixtures are generally obtained. These are used in mixtures in which the sum of the R and R' groups differ by two carbon atoms such as in the commercially available Merck Nematic Phase 5 mixture which consists of the following two compounds and their isomers:

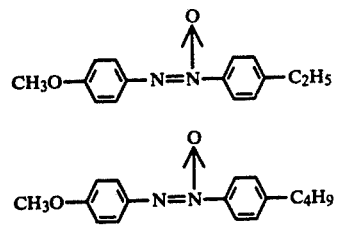

The general practice of using different length nematic compounds for mixtures also pertains to other LC classes such as Schiff bases and esters. For example, the nematic temperature range of Schiff base mixtures are reported, in U.S. Pat. No. 3,540,796 issued to J. E. Goldmacher et al on Nov. 17, 1970, to be widened by using mixtures such as the following where the R plus R' total is different by three carbons:

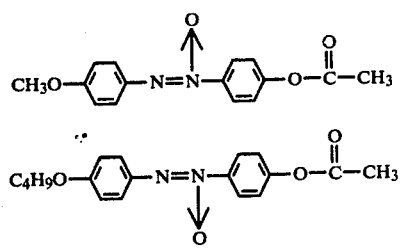

However, the following mixture, where R plus R' is only one carbon different showed only a very slight decrease in its melting point (m.p.) (45°) compared to the m.p. of its lower melting component (49°):

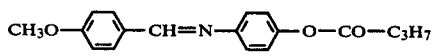

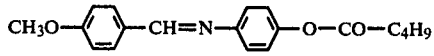

A one carbon difference has a larger effect when it is the different between a methyl and ethyl group such as in the well known MBBA/EBBA mixture

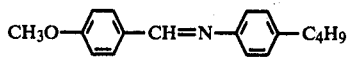

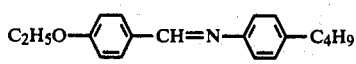

which does have a depressed m.p. compared to its two components.

Many ester mixtures with widened temperature ranges have been prepared from different molecular length mixtures from the same homologous series. For example, the commercially available Merck Nematic Phase 1052 Licristal uses the following binary mixture in which R plus R' differs by five carbons:

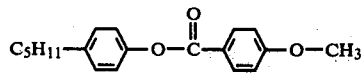

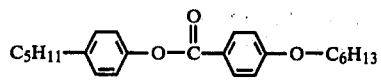

Similarly, an acyloxy mixture (Merck Nematic Phase 1008 Licristal) is a binary mixture in which R plus R' differs by four carbon atoms

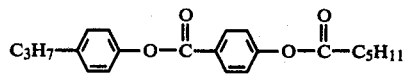

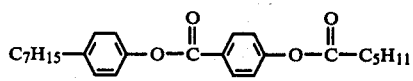

Different classes of esters, not all part of a homologous series, have also been combined to form wide temperature range nematic mixtures, but generally the sums of the R plus R' end groups are different, or else an entirely different end group is used in place of one of the alkyl or alkoxy groups. Thus, there is a distinct difference in molecular length of the components, and often in the end group structure as well. One example of this is the HRL-2N10 mixture, which contained one dialkyl phenyl benzoate and three dialkoxy phenyl benzoates, that was reported by H. S. Lim et al, in Appl. Phys. Lett., 28, 478 (1976). All of the components in this mixture are of distinctively different molecular lengths.

Another example of a wide nematic range ester mixture with combined classes which have different end groups as well as different molecular lengths is shown in U.S. Pat. No. 4,000,084 issued to P. Y. Hsieh, et al on Dec. 28, 1976.

All of these examples are shown to explain and illustrate the prior art of combined LC components to widen the nematic temperature range of mixtures. Similar components with essentially the same molecular length (for example, constant values for the R+R' carbon and phenyl benzoate) have been avoided, presumably to avoid solid solution formation. We found that even a mixture of the esters p-hexyloxyphenyl p'-butylbenzoate (60-4) and p-hexyloxyphenyl p'-pentylbenzoate (60-5) which differ in length by only one methylene group, forms a solid solution phase diagram.

SUMMARY OF THE INVENTION

The general purpose of the present invention is to provide new and improved liquid crystal mixtures and related processes of making the same which overcome most, if not all, of the above-described disadvantages and limitations of prior art liquid crystal mixtures, while simultaneously exhibiting certain other improved characteristics described in more detail below. The present invention involves the provision of novel liquid crystal mixtures of esters wherein at least two of the components of said mixtures are short chain esters which have identical or substantially identical, molecular lengths and which form binary eutectic mixtures. These mixtures differ from prior art liquid crystal mixtures that are comprised of liquid crystal materials whose average molecular length differ by a length equivalent to at least two bonded carbon atoms.

The formation of eutectic mixtures with short chain esters, in accordance with the present invention, has facilitated the provision of a multiplicity of low viscosity liquid crystal mixtures that are comparatively more stable than the above prior art liquid crystal mixtures and which exhibit negative dielectric anisotropies, high conductivity anisotropies, good birefringence and good dopant solubilities over a wide nematic temperature range.

Low viscosity liquid crystal mixtures are desirable for use in electro-optical devices requiring fast response characteristics in a DS mode operation.

Accordingly, the primary purpose of this invention is to provide low viscosity ester liquid crystal mixtures which exhibit nematic characteristics over a wide temperature range.

Another purpose of this invention is to provide low viscosity liquid crystal mixtures which exhibit negative dielectric anisotropies and are suitable for use in DS mode light display applications.

A further purpose of this invention is to provide relatively stable liquid crystal mixtures which exhibit good birefringence and high dopant solubilities as well as low viscosities.

A still further purpose of this invention is to provide a process for selecting liquid crystal mixture components that facilitates the preparation of eutectic LC mixtures having relatively low average molecular lengths.

That we have achieved the above-stated purposes while avoiding most, if not all, of the disadvantages of the prior art will become apparent upon reference to the following detailed description of our invention.

DETAILED DESCRIPTION OF THE INVENTION

This invention describes methods of combining relatively short length phenyl ester liquid crystals (LCs) to obtain new eutectic mixtures with wide nematic phase temperature ranges and novel LC mixtures. Phenyl ester LCs have the advantages of being colorless and of being relatively more stable to moisture, visible light, heat, and electrochemical reactions as compared to many other LCs, such as azoxybenzenes and Schiff bases. Thus, they are particularly useful for electro-optical (E-O) devices, especially when direct current (dc) activation is used. However, mixtures with a wide nematic temperature range and low viscosities are difficult to obtain, particularly mixtures with negative anisotropy which are suitable for dynamic scattering (DS) E-O applications.

Mixtures prepared in accordance with our invention are shown to have lower viscosities, higher birefringence, higher conductive dopant solubility and higher conductivity anisotropy than similar LC mixtures with longer molecular length (i.e. longer average sums of their R+R' end groups).

We have discovered a way to obtain eutectic (or depressed mp) behavior with binary mixtures of short chain LC ester components which have identical sums for the number of carbon atoms in their alkyl R+R' end groups. These binary components thus have identical or nearly identical molecular lengths. Other different length ester compounds are then mixed with one or more of these binary mixtures to obtain multi-component ester mixtures with wide nematic temperature ranges and relatively short average molecular lengths, as well as other desired electro-optical properties. Although the techniques of this invention are applicable for obtaining mixtures for longer length components, the main advantage is in the formulation of ester mixtures with short average lengths where are otherwise not possible to obtain.

Basically, novel binary sets of eutectic liquid crystal mixtures are prepared, from esters which either form a homologous series of compounds having identical molecular lengths or which belong to different classes of compounds which have identical, or substantially identical, molecular lengths. These binary sets are then utilized to form multi-component mixtures with other esters, which may or may not belong to the class of compounds used to form the binary set, that exhibit relatively low viscosities and nematic characteristics over wide temperature ranges.

The binary sets of our invention are formed by judiciously selecting compounds of essentially equal molecular length from within a homologous series of esters such that the number of carbon atoms in the respective end groups of each compound within the set differs from the other by at least the absolute value of two $|2|$ or by selecting esters from two different classes of compounds such that the total number of carbon atoms in the terminal end groups of each are identical regardless of the specific structure of the terminal groups.

We have discovered that by selecting LC compounds as stated above, we can form binary sets of eutectic liquid crystal mixtures from a multiplicity of relatively short chain liquid crystal compounds under conditions which, heretofore, were believed to be unsuitable because of their propensities to form solid solutions.

Our invention is particularly useful for the formation of binary sets of liquid crystal mixtures and multiple component liquid crystal mixtures from esters having alkyl and/or alkoxy terminal end groups. The term "alkyl" is understood in the art to mean a moiety whose formula is $C_nH_{2n+1}$ while the term "alkoxy" is known, by those skilled in the art, to refer to a moiety whose formula is $C_nH_{2n+1}O$. The number of carbon atoms, n, in the alkyl or alkoxy end groups of the esters utilized in our invention may range from one to eight. Our studies have been limited to esters having alkyl and/or alkoxy terminal end groups which may be more specifically referred to as aliphatic end groups or as normal alkyl (n-alkyl) or normal alkoxy (n-alkoxy) groups in that there are no branched or side chains involved.

Generic classes of compounds found to be useful in this invention include, but are not limited to, the esters shown in the following table. Also shown, in the following table, is a shorthanded notation suitable for specifying various compounds or classes of compounds without resorting to complex chemical names.

TABLE I

Liquid Crystal Esters and Their Shorthand Notations

| Generic Name | Structure | Notation |
|---|---|---|
| p-alkoxyphenyl p'-alkylbenzoate | RO—⟨⟩—O—C(=O)—⟨⟩—R' | RO—R' |
| p-alkylphenyl p'-alkoxybenzoate | R—⟨⟩—O—C(=O)—⟨⟩—OR' | R—OR' |
| p-alkoxyphenyl p'-alkylthiobenzoate | RO—⟨⟩—S—C(=O)—⟨⟩—R' | ROSR' |
| p-alkylphenyl p'-alkoxythiobenzoate | R—⟨⟩—S—C(=O)—⟨⟩—OR' | RSOR' |
| p-alkoxyphenyl p'-alkylbenzoate | RO—⟨⟩—O—C(=O)—⟨⟩—R' | RO—OR' |
| p-alkoxyphenyl p'-alkoxythiobenzoate | RO—⟨⟩—S—C(=O)—⟨⟩—OR' | ROSOR' |

TABLE I-continued
Liquid Crystal Esters and Their Shorthand Notations

| Generic Name | Structure | Notation |
|---|---|---|
| p-alkoxyphenyl 4-alkylcyclohexanecarboxylate | RO—⌬—O—CO—(H)—R' | RO—(C)R' |
| p-alkoxyphenyl p'-acyloxybenzoate | RO—⌬—O—CO—⌬—O—CO—R' | RO—OOCR' |
| 4-alkylbiphenyl-4'-yl p'-alkylbenzoate | R—⌬—⌬—O—CO—⌬—R' | Rφ—R' |
| p-alkylphenyl 4''-alkylbiphenyl-4'-carboxylate | R—⌬—O—CO—⌬—⌬—R' | R—φR' |
| p-alkylphenyl p'-(alkylbenzoyloxy)benzoate | R—⌬—O—CO—⌬—O—CO—⌬—R' | R—OOCφR' |
| p-alkylphenyl p'-(p''-alkylbenzoyloxy)o-chlorobenzoate | R—⌬—O—CO—⌬(Cl)—O—CO—⌬—R' | R—(Cl)OOCφR' |
| 2-methyl-1,4-phenylene di(4-alkylbenzoate) | R—⌬—CO—O—⌬(CH3)—O—CO—⌬—R' | RφCOO(CH3)—R |
| p-acyloxyphenyl p'-alkoxybenzoate | R—CO—O—⌬—O—CO—⌬—OR' | RCOO—OR' |

Given the notations shown in Table I, any class of esters may be specified. For example: the terminal end groups are shown by R and R' where; the presence of an alkyl-O-, or alkoxy, terminal group on the ester is indicated by a "RO" or an "OR"; the phenyl benzoate structure

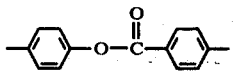

is represented by a "—"; the phenyl thiobenzoate structure

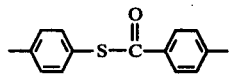

is represented by "-S-"; a phenyl cyclohexanecarboxylate structure

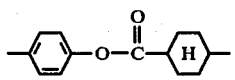

is represented by "—(C)"; an akyloxy structure

is shown by "OOCR"; and a benzyloxy structure

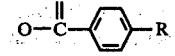

is shown by "OOCφR". Various substituents may be represented by their individual symbols such as Cl for Chlorine, CH3 for methylene etc. When used in parenthesis, eg (Cl) or (CH3), this refers to an ortho-substituted group as indicated in Table I.

In order to identify a specific compound with the notations shown in Table I, one simply substitutes, for R and R', the number of carbon atoms ($C_n$) in the respective aliphatic end groups. For example: p-ethoxyphenyl p'-propylbenzoate may be shown as 20-3; and p-butoxyphenyl p'-methylbenzoate may be shown as 40-1.

As mentioned above, one new technique (Method I) of forming a binary eutectic mixture with short esters is to combine equal length ester compounds from a homologous series in a binary mixture, where the alkyl end group lengths are substantially different at the same molecular positions notwithstanding the identity of the sum of the end group lengths and the overall molecular lengths. For example, if a binary set is to be prepared by combining compound A, which has $R_a$ and $R_a'$ alkyl end groups, with compound B, which has $R_b$ and $R'_b$ alkyl end groups where the number of carbon atoms in A ($R_a + R'_a$) is equal to the number of carbon atoms in B ($R_b + R'_b$) we select two compounds from within the homologous series such that $R_a - R_b$ and $R'_a - R'_b$ is equal to or greater than the absolute value of 2, i.e. $|R_a - R_b| \geq 2$ and $|R'_a - R'_b| \geq 2$. Examples of binary sets or mixtures prepared in accordance with the technique are shown in the following Table:

TABLE II

Homologous Series From Which Eutectic Binary Sets are Formed by Method I

| Series No. | Generic Notation | Generic Structure | Specific Examples R | Specific Examples R' | Molecule Notation |
|---|---|---|---|---|---|
| 1. | R—R' | R—⌬—O—C(=O)—⌬—R' | CH₃<br>C₄H₉ | C₄H₉<br>CH₃ | 1-4<br>4-1 |
| 2. | RO—R' | R—O—⌬—O—C(=O)—⌬—R' | C₂H₅<br>C₄H₉ | C₃H₇<br>CH₃ | 20-3<br>40-1 |
| 3. | R—OR' | R—⌬—O—C(=O)—⌬—O—R' | CH₃<br>C₆H₁₃ | C₆H₁₃<br>CH₃ | 1-06<br>6-01 |
| 4. | RO—OR' | R—O—⌬—O—C(=O)—⌬—O—R' | C₄H₉<br>CH₃ | CH₃<br>C₄H₉ | 40-01<br>10-04 |
| 5. | ROSR' | R—O—⌬—S—C(=O)—⌬—R' | C₂H₅<br>C₄H₉ | C₃H₇<br>CH₃ | 20S3<br>40S1 |
| 6. | RSOR' | R—⌬—S—C(=O)—⌬—O—R' | CH₃<br>C₄H₉ | C₄H₉<br>CH₃ | 1SO4<br>4SO1 |
| 7. | RO—(C)R' | R—O—⌬—O—C(=O)—(H)—R' | C₂H₅<br>C₄H₉ | C₃H₇<br>CH₃ | 20-(C)3<br>40-(C)1 |
| 8. | RO—OOCR' | RO—⌬—O—C(=O)—⌬—O—C(=O)—R' | CH₃<br>C₃H₇ | C₃H₇<br>CH₃ | 10-OOC3<br>30-OOC1 |

Method II of our invention techniques is to combine components of equal molecular length (or substantially equal length) from different classes of esters. Once again the sum of carbons in the R+R' alkyl end groups are the same for each component in the mixture. This is applicable to many ester classes, as indicated by the combinations and illustrative examples in Table 2. Although $R_a + R'_a = R_b + R'_b$, the number of carbons in $R_a$ of the class A compound does not necessarily have to be different than the $R_b$ of class B compound. It should be noted that not all combinations of different class esters give eutectic mixtures. For example, R-OR' mixed with equal length ROSOR', and R-OOCφR' mixed with equal length R-(Cl)OOCφR' do not form eutectic unless $R_a$ and $R_b$ are different.

Typical examples of binary sets prepared in accordance with Method II of our invention are shown in the following Table.

TABLE III

Eutectic Binary Sets of Short Length LC Class Esters of Equal Molecular Length (Method II)

| Mix. No. | Class Combinations | Specific Examples |
|---|---|---|
| 1. | RO—R'<br>ROSR' | 10-4<br>10S4 |
| 2. | R—OR'<br>RSOR' | 1-06<br>1SO6 |
| 3. | ROSR'<br>RSOR' | 40S1<br>1SO4 |
| 4.* | RO—OR'<br>ROSOR' | 60-01<br>10S06 |
| 5. | RO—R'<br>RO—(C)R' | 20-3<br>20-(C)3 |
| 6. | ROSR'<br>RO—(C)R' | 20S5<br>20-(C)5 |
| 7. | RO—OOCR'<br>RCOO—OR' | 10-OOC3<br>1C00-03 |
| 8. | Rφ—R'<br>R—φR' | 3φ-4<br>3-φ4 |
| 9. | R—OOCφR'<br>RφCOO(CH₃)—R' | 2-OOCφ2<br>2φCOO(CH₃)—2 |

*This combination of classes also requires the absolute value of $R_a - R_b$ to be equal to or greater than 2 in order to form a eutectic mixture.

While our Method I is generally not needed for mixtures of two classes of compounds as shown in Table 3, we did observe an exception in the mixtures of p-alkoxyphenyl p'-alkoxybenzoates and p-alkoxyphenyl p'-alkoxythiobenzoates which form solid solutions unless a variation of Method I is also used in which $|R_a - R_b| \geq 2$ in addition to the class differences. This combination of Methods I and II is called Method III. For example: 60-01 mixed with 10S06 forms a eutectic mixture (Method III) while 60-01 mixed with 60S01 forms a solid solution.

In practice, binary mixtures are prepared from purified individual components which have been characterized by differential scanning calorimetry (DSC) to determine their melting points (mp), their clear points (Clpt), and heat of fusion ($\Delta H_f$). With this data, it is then possible to compute idealized eutectic compositions and eutectic temperatures, using the Schroeder-VanLaar equation $$T_i = \frac{\Delta H_f}{\left(\frac{\Delta H_f}{T_m}\right) R \ln x_i}$$

where $T_i$ is the low end of the melting range of component i of the mixture, $\Delta H_f$ is the molar heat of fusion of pure component i, $T_m$ is the melting point of pure component i, $x_i$ is the mole fraction of component i in the mixture and R is the standard gas constant. The equation is applied to each component i in the mixture and solved simultaneously. Examples of binary mixtures made in accordance with the above are shown in the following Table IV.

TABLE IV

Comparison of Calculated v. Observed Nematic Temperature Ranges For Binary Mixtures of Equal Length Components

| Mixing Method | Components Code No. | Mole Fract. | Nematic Temp. Range °C. Calculated | Observed |
|---|---|---|---|---|
| I | 20-3 | 0.515 | 53.0–60.6 | 52.1–61.9 |
|   | 40-1 | 0.484 | | |
| I | 20-5 | 0.581 | 47.3–60.2 | 43.8–60.8 |
|   | 40-3 | 0.419 | | |
| I | 20S3 | 0.367 | 50.5–84.7 | 45.4–84.4 |
|   | 40S1 | 0.633 | | |
| I | 20S5 | 0.256 | 39.4–83.3 | 39.2–75.5 |
|   | 40S3 | 0.744 | | |
| I | 10S4 | 0.505 | 42.7–67.6 | 28.8–65.8 |
|   | 40S1 | 0.495 | | |
| I | 10-04 | 0.366 | 66.0–80.0 | 64.8–81.2 |
|   | 40-01 | 0.634 | | |
| II | 1-06 | 0.561 | 41.2–61.6 | 48.2–60.8 |
|   | 1S06 | 0.438 | | |
| II | 10-4 | 0.583 | (43.6–38.2) | (43.1–39.0)$^a$ |
|   | 10-S4 | 0.417 | | |
| II | 10-4 | 0.680 | (48.0–42.3) | (49.5–38.2)$^a$ |
|   | 1S04 | 0.320 | | |
| II | 10S5 | 0.358 | 24.8–70-9 | 27.9–68.4 |
|   | 10-(C)5 | 0.642 | | |
| II | 20-3 | 0.319 | 36.4–74.6 | 37.8–73.9 |
|   | 20-(C)3 | 0.681 | | |
| II | 20-3 | 0.563 | 56.2–80.3 | 69.8–79.0 |
|   | 20S3 | 0.437 | | |
| II | 20-5 | 0.647 | 50.3–71.4 | 58.0–70.9 |
|   | 20S5 | 0.353 | | |
| II | 40-6 | 0.412 | 20.7–61.1 | 21.9–61.8 |
|   | 40S6 | 0.588 | | |
| III | 60-01 | 0.579 | 37.0–86.9 | 50.6–87.0 |
|   | 10S06 | 0.421 | | |

$^a$ monotropic mixtures

It should be noted that in each binary mixture the $R_a + R_a'$ sum of carbon atoms for Compound A is the same as the $R_b + R_b'$ sum for Compound B. The components of binary mixtures from the homologous series (Method I), such as 20-3 and 40-1 from the RO-R' class of compounds, have essentially identical molecular lengths. The components from mixed classes (Method II), such as 10-4 and 10S4 (from the RO-R' and ROSR' classes respectively), have nearly equal molecular lengths, differing in this case by only the small bond link differences between an ester and a thioester group. Similarly, the mixtures of phenyl benzoates and phenyl cyclohexanecarboxylates differ in molecular lengths only by the differences between the length of a benzene ring and a cyclohexane ring.

Binary sets of eutectic liquid crystal mixtures such as those shown in Tables II, III, and IV above may then be utilized to form multi-component liquid crystal mixtures by adding other esters to the binary sets to form short molecular length mixtures. Using the Shroeder-VanLaar equation as a starting point, we computed compositional mole fractions and prepared multi-component mixtures wherein at least two components within the mixtures belong to one of the above-mentioned binary sets. Our "rules" for selecting the other components in a mixture are to use compounds with short molecular lengths (if possible) and to use compounds which are different from each other (and from the binary components) either with respect to class, end groups, or the R+R' sum of carbon atoms. Examples of multi-component mixtures exhibiting relatively low viscosities and short average molecular lengths which were prepared in accordance with our invention are shown in the following Tables. For example: Mixtures of LCs using Method I binary sets are shown in Table V for alkoxyphenyl alkylbenzoates and in Table VI for alkoxyphenyl alkylthiobenzoates; multi-component LC mixtures based on Method II or III combinations of different class binary sets are shown in Table VII; and multi-component LC mixtures based on Method I binary sets combined with Method II binary sets are shown in Table VIII. The compositions of the various eutectic sets, used to form the multi-component mixtures, are identified in the tables by the symbols *, +, # and √ where: * indicates a set of compounds of one length; + indicates a set of compounds of another length; # indicates a set of compounds of a third length; and so on.

When two binary sets have a common compound, a tertiary set of equal length components results. This is illustrated in Table VI by the tertiary set of 10S4, 40S1, and 20S3 in HRL-5N3, and in Table VIII by the use of the tertiary sets 20-3, 40-1, 20-(C)3 and 20-5, 40-3, 20-(C)5 in several of the mixtures. Multi-component eutectic sets may be formed from four, five and six component LC compounds, having substantially the same molecular lengths, by employing overlapping binary sets. For example, a mixture of 20-3, 40-1, 20-(C)3, 20S3, and 40S1 functions as a single binary set when mixed with other esters.

The calculated eutectic compositions, shown in these tables, are for ideal mixtures and are not necessarily exactly the same as the mole fractions for an actual eutectic, or minimum mp composition, especially when a large number of components are used. For example: HRL-256N4 is slightly different from HRL-256N1 which is the calculated eutectic for the same components. Nevertheless, the calculated mixtures are a good starting point from which to proceed to experimentally determine eutectics with our mixtures.

TABLE V

Multi-Component Liquid Crystal Nematic Mixtures Prepared With RO—R' Homologous Compounds, Including Method I Binary Sets

| Compound Code | HRL Mixture No. and Mole Fraction of Each Compound$^a$ | | | | |
| --- | --- | --- | --- | --- | --- |
|  | 2N42 | 2N43 | 2N44 | 2N48 | 42/48 |
| 10-1 | 0.112 | 0.073 | | | 0.063 |
| 20-3 | 0.222* | 0.148* | | | 0.124* |
| 20-5 | 0.283+ | 0.180+ | 0.240* | | 0.158+ |
| 40-1 | 0.191* | 0.119* | | | 0.107* |

TABLE V-continued

Multi-Component Liquid Crystal Nematic Mixtures Prepared With RO—R' Homologous Compounds, Including Method I Binary Sets

| Compound Code | HRL Mixture No. and Mole Fraction of Each Compound[a] | | | | |
|---|---|---|---|---|---|
| | 2N42 | 2N43 | 2N44 | 2N48 | 42/48 |
| 40-3 | 0.192+ | 0.117+ | 0.160* | | 0.108+ |
| 40-6 | | 0.364 | | | |
| 60-3 | | | | 0.249 | 0.110 |
| 60-4 | | | 0.601 | | |
| 60-5 | | | | 0.331* | 0.146# |
| 80-3 | | | | 0.213* | 0.094# |
| 80-6 | | | | 0.207 | 0.091 |
| Nematic Properties | | | | | |
| Viscosity: cP @ 25° C. | 32.6 | 36.5 | 38.1 | 44.5 | 36.9 |
| mp[b], °C. | 5.3 | −5.8 | −7.8 | 18.0 | 2.4 |
| Clpt[c], °C. | 57.7 | 52.4 | 51.4 | 56.3 | 55.6 |
| Mol. Length, Å | 30.39 | 22.37 | 24.31 | 27.14 | 23.36 |

[a]Calculated eutectic mixtures, except 42/48 which is an equal weight mixture of 2N42 and 2N48;
[b]Observed crystal to nematic mp after brief cooling to −40° C.; and
[c]Observed nematic to isotropic clearpoint.

TABLE VI

Multi-Component Thioester Liquid Crystal Mixtures Containing Method I Binary Sets of ROSR' Compounds

| Compound Code | HRL Mixture No. Mole Fraction of Each Compound[a] | | |
|---|---|---|---|
| | 5N1 | 5N2 | 5N3 |
| 10S4 | | 0.131 | 0.094* |
| 10S5 | 0.157 | | 0.123 |
| 10S06 | | | 0.110 |
| 20S3 | 0.074* | | 0.058* |
| 20S5 | | 0.063* | |
| 40S1 | 0.127* | 0.134 | 0.097* |
| 40S3 | 0.270 | 0.283* | 0.217 |
| 40S6 | 0.372 | 0.389 | 0.302 |
| Nematic Properties | | | |
| mp[b], °C. | <0 | −9.6 | <0 |
| Clpt[c], °C. | 72.8 | 72.2 | 76.0 |
| Mol. Length | 23.39 | 22.23 | 23.10 |

[a]Calculated eutectic mixtures;
[b]Observed Crystal to nematic mp after brief cooling to −40° C.; and
[c]Observed nematic to isotropic clearpoint.

TABLE VII

Multi-Component Liquid Crystal Nematic Mixtures Including Method II or Method III Binary Sets

| Compound Code(a) | HRL Mixture No. and Mole Fraction of Each Compound[a] | | | | |
|---|---|---|---|---|---|
| | 26N4 | 256N1 | 256N4 | 256N5 | 26N14 |
| 10-(C)5 | | | | | 0.293 |
| 10-00C3 | 0.058 | 0.043 | 0.047 | 0.044 | 0.041 |
| 10S5 | | 0.163 | 0.163 | 0.138 | |
| 10S06 | | 0.116* | 0.108* | 0.101* | |
| 20-3 | 0.108* | 0.070+ | 0.084+ | 0.078+ | 0.068* |
| 20-(C)3 | 0.223* | 0.171+ | 0.163+ | 0.152+ | 0.156* |
| 20-5 | 0.121 | 0.078 | 0.087 | 0.081 | 0.075 |
| 40-00C4 | 0.073 | 0.052 | 0.056 | 0.052 | |
| 40-05 | | | | 0.085 | |
| 4-00Cϕ4 | | | | | 0.041 |
| 60-01 | 0.194 | 0.134* | 0.154* | 0.144* | 0.147 |
| 60-00C5 | 0.223 | 0.174 | 0.137 | 0.128 | 0.169 |
| Nematic Properties | | | | | |
| Viscosity; Cp @ 25° C. | 49.3 | | | 58.2 | 37.2 |
| mp[b], °C. | <0 | 0–10 | <0 | <0 | (−0.2) |
| mp[c], °C. | | 6–18 | 6–13 | 0–5 | 31–32 |
| Clpt[d], °C. | 77.0 | 77.2 | 75.2 | 77.5 | 73.6 |
| Average Molecular Length L̄, Å | 23.29 | 23.18 | 22.89 | 23.32 | 22.85 |

| Compound Code(a) | Mole Fraction of Each Compound In Each Mixture | | | | |
|---|---|---|---|---|---|
| | 26N20 | 26N24 | 26N25 | 256N6 | 246N9 |
| 10-(C)5 | 0.257 | | 0.272 | 0.242* | 0.267 |
| 10-00C3 | 0.034 | | 0.037 | | 0.036 |
| 10S5 | | | | 0.131* | |
| 20-3 | 0.057* | 0.033* | 0.061* | 0.053+ | 0.060* |
| 20-(C)3 | 0.132* | 0.077* | 0.142* | 0.122+ | 0.139* |
| 20-5 | 0.062+ | 0.033 | 0.067+ | 0.057# | 0.066+ |
| 20-(C)5 | 0.071+ | | 0.077+ | 0.065# | 0.075+ |
| 3ϕ-4 | | | | | 0.088 |
| 40-00C4 | 0.041 | | 0.045 | 0.037 | 0.044 |
| 40-(C)4 | | 0.233 | | | |
| 4-00Cϕ4 | 0.066# | | 0.070 | 0.061 | |
| 4ϕCOO(CH3)—4 | 0.065# | | | | |
| 5-(Cl)00Cϕ5 | | 0.167 | | | |
| 60-3 | | 0.108 | | | |
| 60-5 | 0.215 | 0.133+ | 0.229 | 0.201 | 0.224 |
| 60-(C)5 | | 0.216+ | | | |
| Nematic, C. | | | | | |
| Viscosity, Cp @ 25° C. | 39.2 | 42.9 | 30.9 | | |
| mp[b], °C. | (−3.9) | (−15.3) | (−2.3) | (−5.5) | (−2.8) |
| mp[c], °C. | <−17 | <−17 | <3 | | |
| Clpt[d], °C. | 77.4 | 75.5 | 73.9 | (78.0) | (81.0) |
| Mole Length, L̄, Å | 23.49 | 25.82 | 23.15 | 22.93 | 22.93 |

[a]Calculated eutectic mixtures, except 256N4 and 256N5 which were determined experimentally;
[b]Observed crystal to nematic mp after brief cooling to −40° C. Calculated values in parentheses was calculated;
[c]Observed temperature for complete conversion to nematic after long cooling period at −17° C.; and
[d]Observed clearpoint to isotropic. Calculated values are in parentheses.

TABLE VIII

Multi-Component LC Nematic Mixtures Which Include Both Method I and Method II Binary Sets

| Compound Code | HRL Mixture No. and Mole Fraction of Each Compound[a] | | | | | | | |
|---|---|---|---|---|---|---|---|---|
| | 26N3 | 256N12 | 246N2 | 246N3 | 246N6 | 246N7 | 256N9 | 2456N1 |
| 10-(C)5 | | .176 | .268 | .278 | .235 | .278 | | .246* |
| 10S5 | | .094 | | | | | | .133* |
| 20-3 | .033 | .035 | .060 | .063* | .051* | .063* | .076* | .054+ |
| 20-(C)3 | | .081 | .139 | .046* | .117* | .146* | .174* | .125+ |
| 20S3 | | | | | | | .066* | |
| 20-5 | | .036 | .066 | .070+ | .054+ | .070+ | .085+ | .058# |
| 20-(C)5 | | .040 | .075 | .080+ | .062+ | .080+ | .098+ | .066# |
| 20S5 | | | | | | | .054+ | |
| 2-(Cl)00ϕ2 | | .144 | | | | | | |
| 3ϕ-4 | | | .093 | .092 | .078 | .092 | | .082 |
| 40-1 | | .022 | .042 | .044* | .034* | .044* | .054# | .037+ |
| 40S1 | | | | | | | .102# | |
| 40-3 | | .020 | .039 | .042+ | .032+ | .042+ | .052 | .034# |
| 40S3 | | | | | | | .239 | |
| 40-(C)4 | .280 | .242 | | | | | | |
| 40-6 | | | .118 | | .095 | | | |

TABLE VIII-continued
Multi-Component LC Nematic Mixtures Which Include
Both Method I and Method II Binary Sets

| Compound Code | 26N3 | 26N30 | 246N2 | 246N3 | 246N6 | 246N7 | 256N9 | 245N1 |
|---|---|---|---|---|---|---|---|---|
| 5φ-4 | | | | .083 | | | | |
| 5-φ5 | | | .099 | .102 | .088 | | | |
| 5-(Cl)OOCφ5 | .169 | | | | | | | |
| 60-3 | | .113 | | | .155 | .186 | | .163 |
| 60-5 | .147* | | | | | | | |
| 60-(C)5 | .220* | | | | | | | |
| 60-01 | .065 | | | | | | | |
| 80-3 | .086* | | | | | | | |
| Nematic Properties | | | | | | | | |
| Viscosity: cP @ 25° C. | 47.8 | | | | | | | |
| mp$^b$, °C. | <−17 | (−14.2) | (−2.7) | (1.7) | (−6.4) | (−1.7) | (2.3) | (−5.1) |
| mp$^c$, °C. | <−17 | | | | | | | |
| Clpt$^d$, °C. | 75.8 | (77.4) | (89.8) | (101.0) | (85.2) | (79.3) | (77.5) | (78.3) |
| Mol. Length | 26.41 | 22.55 | 24.33 | 22.61 | 22.95 | 22.05 | 21.23 | 21.98 |

$^a$Calculated eutectic mixture;
$^b$Observed crystal to nematic mp after brief cooling at −40° C.;
$^c$Observed temperature for complete conversion to nematic after long period of storage at −17° C.; and
$^d$Observed clearpoint. Calculated values in parentheses.

While the vast majority of the multi-component mixtures shown in the preceding tables were prepared from mixtures of liquid crystal compounds, it should be noted that in Table V the compound p-methoxyphenyl p'-methylbenzoate (10-1) is also used as a short length component. We have found that 10-1 is a virtual nematic compound with a crystal to isotropic mp of 96.2° C. and a a virtual nematic to isotropic clearpoint of approximately 10° C. The pure compound melts sharply at 96.2° C. and shows no direct sign of liquid crystalline (even monotropic) properties. However, we have found that when 10-1 is used in mixtures of other ester liquid crystals which have binary mixtures therein, then it behaves as a virtual nematic liquid crystal. Since 10-1 has very short R and R' groups, it can be used as an aid in shortening the average molecular length of ester molecules in a mixture. See for example, mixture No. HRL-2N42, 2N43 and 2N42/48 in Table V.

The significance of using binary sets of short chain esters to form multi-component nematic mixtures can be realized upon reference to our papers recently accepted for publication to be printed in Molecular Crystals and Liquid Crystals. These papers show the effect of average molecular length on viscosity and on other properties of nematic liquid crystal mixtures. In the above-mentioned papers, it is taught that with increasing average length ($\bar{L}$) the flow viscosity of liquid crystal mixtures increases sharply. The dielectric constant perpendicular to the director (E), refractive indices (n$_\parallel$ and n$_\perp$), birefringence (Δn) and density of liquid crystal mixtures decrease linearly with $\bar{L}$, and the dielectric anisotropy (ΔE) of these mixtures becomes more negative. When tetrabutylammonium tetraphenylboride is added as a salt dopant, the conductivity anisotropy $\sigma_\parallel/\sigma_\perp$ decreases with increasing $\bar{L}$, and the dynamic-scattering (DS) threshold voltage increases correspondingly. The effect of $\bar{L}$ on the DS decay time T$_d$ is highly dependent on the surface alignment. In surface-perpendicular cells, T$_d$ increases strongly with $\bar{L}$, while in surface-parallel cells, T$_d$ decreases slightly with increasing $\bar{L}$. The temperature dependence of $\sigma_\parallel/\sigma_\perp$ indicates that the longer $\bar{L}$ mixtures, with about 10 or more total alkyl carbons from both end groups, have cybotactic nematic characteristics.

INDUSTRIAL APPLICABILITY

The binary sets of eutectic liquid crystal mixtures and the multi-component liquid crystal mixtures prepared therefrom in accordance with this invention are useful in the preparation of liquid crystal mixtures for diverse electro-optical applications. The use of the binary concept for preparing eutectic mixtures with short chain esters is extremely valuable in that short chain low viscosity LC compounds facilitate the preparation of low molecular weight liquid crystal mixtures and liquid crystal mixtures which have low viscosities. These mixtures have broad application in the light display and field effect applications.

Having fully disclosed our invention, and provided teachings which will enable others to make and use the same, the scope of our claims may now be understood as follows:

We claim:

1. Liquid crystal mixtures comprising a eutectic mixture consisting essentially of components selected from Table A herein and including at least one binary set of components, said binary set consisting of two components selected from one of the following Groups:

Group 1: 1S04, 10-4, 10S4, 10-OOC3, 20-3, 20S3, 20-(C)3, 40S1;
Group 2: 10-04, 10S04, 10S5, 10-(C)5, 40-01;
Group 3: 1-06, 1S06, 20-5, 20S5, 20-(C)5, 40-3, 40S3;
Group 4: 10-06, 10S06, 2-OOCφ2, 2-(Cl)OOCφ2, 2φCOO(CH₃)-2, 40-(C)4, 60-01;
Group 5: 40-6, 40-05, 40S6, 40-OOC4, 60-(C)4;
Group 6: 4-OOCφ4, 4φCOO(CH₃)-4;

TABLE A

| Code | Structure |
|---|---|
| 1-06 | CH₃—⟨⟩—OOC—⟨⟩—OC₆H₁₃ |
| 10-1 | CH₃O—⟨⟩—OOC—⟨⟩—CH₃ |
| 10-4 | CH₃O—⟨⟩—OOC—⟨⟩—C₄H₉ |
| 10-04 | CH₃O—⟨⟩—OOC—⟨⟩—OC₄H₉ |

TABLE A-continued

| Code | Structure |
|---|---|
| 10-06 | CH₃O—⌬—OOC—⌬—OC₆H₁₃ |
| 1604 | CH₃—⌬—SOC—⌬—OC₄H₉ |
| 1606 | CH₃—⌬—SOC—⌬—OC₆H₁₃ |
| 1064 | CH₃O—⌬—SOC—⌬—C₄H₉ |
| 1065 | CH₃O—⌬—SOC—⌬—C₅H₁₁ |
| 10604 | CH₃O—⌬—SOC—⌬—OC₄H₉ |
| 10606 | CH₃O—⌬—SOC—⌬—OC₆H₁₃ |
| 10-(C)5 | CH₃O—⌬—OOC—(H)—C₅H₁₁ |
| 10-OOC3 | CH₃O—⌬—OOC—⌬—OOC—C₃H₇ |
| 20-3 | C₂H₅O—⌬—OOC—⌬—C₃H₇ |
| 20-5 | C₂H₅O—⌬—OOC—⌬—C₅H₁₁ |
| 2063 | C₂H₅O—⌬—SOC—⌬—C₃H₇ |
| 2065 | C₂H₅O—⌬—SOC—⌬—C₅H₁₁ |
| 20-(C)3 | C₂H₅O—⌬—OOC—(H)—C₃H₇ |
| 20-(C)5 | C₂H₅O—⌬—OOC—(H)—C₅H₁₁ |
| 2-OOCφ2 | C₂H₅—⌬—OOC—⌬—OOC—⌬—C₂H₅ |
| 2-(Cl)OOCφ2 | C₂H₅—⌬—OOC—⌬(Cl)—OOC—⌬—C₂H₅ |
| 2φCOO(CH₃)—2 | C₂H₅—⌬—COO—⌬(CH₃)—OOC—⌬—C₂H₅ |
| 3φ-4 | C₃H₇—⌬—⌬—OOC—⌬—C₄H₉ |
| 40-1 | C₄H₉O—⌬—OOC—⌬—CH₃ |
| 40-3 | C₄H₉O—⌬—OOC—⌬—C₃H₇ |
| 40-6 | C₄H₉O—⌬—OOC—⌬—C₆H₁₃ |
| 40-01 | C₄H₉O—⌬—OOC—⌬—OCH₃ |
| 40-05 | C₄H₉O—⌬—OOC—⌬—OC₅H₁₁ |
| 4061 | C₄H₉O—⌬—SOC—⌬—CH₃ |
| 4063 | C₄H₉O—⌬—SOC—⌬—C₃H₇ |
| 4066 | C₄H₉O—⌬—SOC—⌬—C₆H₁₃ |
| 40-(C)4 | C₄H₉O—⌬—OOC—(H)—C₄H₉ |
| 40-OOC4 | C₄H₉O—⌬—OOC—⌬—OOC—C₄H₉ |
| 4-OOCφ4 | C₄H₉—⌬—OOC—⌬—OOC—⌬—C₄H₉ |
| 4φCOO(CH₃)—4 | C₄H₉—⌬—COO—⌬(CH₃)—OOC—⌬—C₄H₉ |
| 5φ-4 | C₅H₁₁—⌬—⌬—OOC—⌬—C₄H₉ |
| 5-φ5 | C₅H₁₁—⌬—OOC—⌬—⌬—C₅H₁₁ |
| 5-(Cl)OOCφ5 | C₅H₁₁—⌬—OOC—⌬(Cl)—OOC—⌬—C₅H₁₁ |
| 60-3 | C₆H₁₃O—⌬—OOC—⌬—C₃H₇ |
| 60-4 | C₆H₁₃O—⌬—OOC—⌬—C₄H₉ |
| 60-5 | C₆H₁₃O—⌬—OOC—⌬—C₅H₁₁ |
| 60-01 | C₆H₁₃O—⌬—OOC—⌬—OCH₃ |
| 60-(C)4 | C₆H₁₃O—⌬—OOC—(H)—C₄H₉ |
| 60-(C)5 | C₆H₁₃O—⌬—OOC—(H)—C₅H₁₁ |
| 60-OOC5 | C₆H₁₃O—⌬—OOC—⌬—OOCC₅H₁₁ |
| 80-3 | C₈H₁₇O—⌬—OOC—⌬—C₃H₇ |
| 80-6 | C₈H₁₇O—⌬—OOC—⌬—C₆H₁₃ |

| Code | Name |
|---|---|
| 1-06 | p-tolyl p-hexoxybenzoate |
| 10-1 | p-methoxyphenyl p-toluate |
| 10-4 | p-methoxyphenyl p-butylbenzoate |
| 10-04 | p-methoxyphenyl p-butylbenzoate |
| 10-06 | p-methoxyphenyl p-hexoxybenzoate |
| 1604 | p-tolyl p-butoxythiobenzoate |
| 1606 | p-tolyl p-hexoxythiobenzoate |
| 1064 | p-methoxyphenyl p-butylthiobenzoate |
| 1065 | p-methoxyphenyl p-pentylthiobenzoate |
| 10604 | p-methoxyphenyl p-butoxythiobenzoate |
| 10606 | p-methoxyphenyl p-hexoxythiobenzoate |
| 10-(C)5 | p-methoxyphenyl trans-4-pentyl-cyclohexanecarboxylate |
| 10-OOC3 | p-methoxyphenyl p-butyryloxybenzoate |
| 20-3 | p-ethoxyphenyl p-propylbenzoate |
| 20-5 | p-ethoxyphenyl p-pentylbenzoate |
| 2063 | p-ethoxyphenyl p-propylthiobenzoate |
| 2065 | p-ethoxyphenyl p-pentylthiobenzoate |
| 20-(C)3 | p-ethoxyphenyl trans-4-propyl-cyclohexanecarboxylate |
| 20-(C)5 | p-ethoxyphenyl trans-4-pentyl |

TABLE A-continued

| Code | Compound |
|---|---|
| 2-OOCφ2 | cyclohexanecarboxylate p-ethylphenyl p-(p-ethylbenzoyloxy)benzoate |
| 2-(Cl)OOCφ2 | p-ethylphenyl p-(p-ethylbenzoyloxy)-o-chlorobenzoate |
| 2φCOO(CH₂)-2 | 2-methyl-1,4-phenylene di(4-ethylbenzoate) |
| 3φ-4 | 4-propylbiphenyl-4'-yl p-butylbenzoate |
| 40-1 | p-butoxyphenyl p-toluate |
| 40-3 | p-butoxyphenyl p-propylbenzoate |
| 40-6 | p-butoxyphenyl p-hexylbenzoate |
| 40-01 | p-butoxyphenyl p-methoxybenzoate |
| 40-05 | p-butoxyphenyl pentyloxybenzoate |
| 4061 | p-butoxyphenyl p-thiotoluate |
| 4063 | p-butoxyphenyl p-propylthiobenzoate |
| 4066 | p-butoxyphenyl p-hexylthiobenzoate |
| 40-(C)4 | p-butoxyphenyl trans-4-butyl-cyclohexanecarboxylate |
| 40-OOC4 | p-butoxyphenyl p-valeryloxybenzoate |
| 4-OOCφ4 | p-butylphenyl p-(p-butylbenzoyloxy)benzoate |
| 4φCOO(CH₂)-4 | 2-methyl-1,4-phenylene di(4-butylbenzoate) |
| 5φ-4 | 4-pentylbiphenyl-4'-yl 4-butylbenzoate |
| 5-φ5 | p-pentylphenyl 4''-pentylbiphenyl-4'-carboxylate |
| 5-(Cl)OOCφ5 | p-pentylphenyl p-(p-pentylbenzoyloxy)-o-chlorobenzoate |
| 60-3 | p-hexoxyphenyl p-propylbenzoate |
| 60-4 | p-hexoxyphenyl p-butylbenzoate |
| 60-5 | p-hexoxyphenyl p-pentylbenzoate |
| 60-01 | p-hexoxyphenyl p-methoxybenzoate |
| 60-(C)4 | p-hexoxyphenyl trans-4-butyl-cyclohexanecarboxylate |
| 60-(C)5 | p-hexoxyphenyl trans-4-pentyl-cyclohexanecarboxylate |
| 60-OOC5 | p-hexoxyphenyl p-hexanoyloxybenzoate |
| 80-3 | p-octyloxyphenyl p-propylbenzoate |
| 80-6 | p-octyloxyphenyl p-hexylbenzoate. |

2. A four component eutectic mixture of claim 1 wherein the binary set 20-5/40-3 is combined with 20-3 and 40-1 in mole fractions of approximately 0.32, 0.22, 0.25 and 0.22 for 20-5, 40-3, 20-3 and 40-1, respectively.

3. A five component eutectic mixture of claim 1 wherein the binary set 20-5/40-3 is combined with 20-3, 40-1 and 60-4 in mole fractions of approximately 0.12, 0.08, 0.10, 0.08 and 0.62 for 20-5, 40-3, 20-3, 40-1 and 60-4, respectively.

4. Multi-component eutectic mixtures of claim 1 wherein the components are phenyl thiobenzoates mixed in the mole fractions indicated in Table B for the mixtures 5N1, 5N2 and 5N3:

TABLE B

| Compound Code | Mixture No. and Mole Fraction of Each Compound | | |
|---|---|---|---|
| | 5N1 | 5N2 | 5N3 |
| 10S4 | | 0.131 | 0.094 |
| 10S5 | 0.157 | | 0.123 |
| 10S06 | | | 0.110 |
| 20S3 | 0.074 | | 0.058 |
| 20S5 | | 0.063 | |
| 40S1 | 0.127 | 0.134 | 0.097 |
| 40S3 | 0.270 | 0.283 | 0.217 |
| 40S6 | 0.372 | 0.389 | 0.302 |

5. Multi-component eutectic mixtures of claim 1 wherein the components are phenylbenzoates mixed in approximately the mole fractions indicated in Table C for the mixtures 2N42, 2N43, 2N44, 2N48, 42/48R:

TABLE C

| Compound Code | Mixture No. and Mole Fraction of Each Compound | | | |
|---|---|---|---|---|
| | 2N42 | 2N43 | 2N44 | 42/48R |
| 10-1 | 0.112 | 0.073 | | 0.032 |
| 20-3 | 0.222 | 0.148 | | 0.068 |
| 20-5 | 0.283 | 0.180 | 0.240 | 0.075 |
| 40-1 | 0.191 | 0.119 | | 0.048 |
| 40-3 | 0.192 | 0.117 | 0.160 | 0.045 |
| 40-6 | | 0.364 | | |
| 60-3 | | | | 0.197 |
| 60-4 | | | 0.601 | |
| 60-5 | | | | 0.249 |
| 80-3 | | | | 0.165 |
| 80-6 | | | | 0.0120. |

6. Multi-component eutectic mistures of claim 1 wherein the components are mixed in approximately the mole fractions indicated in Tables D and E for the mixtures HRL-26N4, -256N1, -256N4, -256N5, -26N14, -26N20, -26N24, -26N25, -256N6 and -246N9:

TABLE D

| Compound Code | Mixture No. and Mole Fraction of Each Compound | | | | |
|---|---|---|---|---|---|
| | 24N4 | 256N1 | 256N4 | 256N5 | 26N14 |
| 10-(C)5 | | | | | 0.293 |
| 10-00C3 | 0.058 | 0.043 | 0.047 | 0.044 | 0.041 |
| 10S5 | | 0.163 | 0.163 | 0.138 | |
| 10S06 | | 0.116 | 0.108 | 0.101 | |
| 20-3 | 0.108 | 0.070 | 0.084 | 0.078 | 0.068 |
| 20-(C)3 | 0.223 | 0.171 | 0.163 | 0.152 | 0.156 |
| 20-5 | 0.121 | 0.078 | 0.087 | 0.081 | 0.075 |
| 40-00C4 | 0.073 | 0.052 | 0.056 | 0.052 | |
| 40-05 | | | | 0.085 | |
| 4-00Cφ4 | | | | | 0.041 |
| 60-01 | 0.194 | 0.134 | 0.154 | 0.144 | 0.147 |
| 60-00C5 | 0.223 | 0.174 | 0.137 | 0.128 | 0.169 |

TABLE E

| Compound Code(a) | Mole Fraction of Each Compound In Each Mixture | | | | |
|---|---|---|---|---|---|
| | 26N20 | 26N24 | 26N25 | 256N6 | 246N9 |
| 10-(C)5 | 0.257 | | 0.272 | 0.242 | 0.267 |
| 10-00C3 | 0.034 | | 0.037 | 0.031 | 0.036 |
| 10S5 | | | | 0.131 | |
| 20-3 | 0.057 | 0.033 | 0.061 | 0.053 | 0.060 |
| 20-(C)3 | 0.132 | 0.077 | 0.142 | 0.122 | 0.139 |
| 20-5 | 0.062 | 0.033 | 0.067 | 0.057 | 0.066 |
| 20-(C)5 | 0.071 | | 0.077 | 0.065 | 0.075 |
| 3φ-4 | | | | | 0.088 |
| 40-00C4 | 0.041 | | 0.045 | 0.037 | 0.044 |
| 40-(C)4 | | 0.233 | | | |
| 4-00Cφ4 | 0.066 | | 0.070 | 0.061 | |
| 4φCOO(CH₂)-4 | 0.065 | | | | |
| 5-(Cl)OOCφ5 | | 0.167 | | | |
| 60-3 | | 0.108 | | | |
| 60-5 | 0.215 | 0.133 | 0.229 | 0.201 | 0.224 |
| 60-(C)5 | | 0.216. | | | |

7. Multi-Component eutectic mixtures of claim 1 wherein the components are mixed in approximately the mole fractions indicated in Tables F and G for the mixtures HRL-26N3, -256N12, -246N2, -246N3, -246N6, -246N7, -256N9 and -2456N1:

TABLE F

| Compound Code | Mole Fraction of Each Compound In Each Mixture | | | |
|---|---|---|---|---|
| | 26N3 | 256N12 | 246N2 | 246N3 |
| 10-(C)5 | | .176 | .268 | .278 |
| 10S5 | | .094 | | |
| 20-3 | .033 | .035 | .060 | .063 |
| 20-(C)3 | | .081 | .139 | .046 |
| 20-5 | | .036 | .066 | .070 |
| 20-(C)5 | | .040 | .075 | .080 |
| 20S5 | | | | |
| 2-(Cl)00φ2 | | .144 | | |

TABLE F-continued

| Compound Code | Mole Fraction of Each Compound In Each Mixture | | | |
|---|---|---|---|---|
| | 26N3 | 256N12 | 246N2 | 246N3 |
| 3φ-4 | | | .093 | .092 |
| 40-1 | | .022 | .042 | .044 |
| 40-3 | | .020 | .039 | .042 |
| 40-(C)4 | .280 | .242 | | |
| 40-6 | | | .118 | |
| 5φ-4 | | | | .083 |
| 5-φ5 | | | .099 | .102 |
| 5-(Cl)00Cφ5 | .169 | | | |
| 60-3 | | .113 | | |
| 60-5 | .147 | | | |
| 60-(C)5 | .220 | | | |
| 60-01 | .065 | | | |
| 80-3 | .086 | | | |

TABLE G

| Compound Code | Mole Fraction of Each Compound In Each Mixture | | | |
|---|---|---|---|---|
| | 246N6 | 246N7 | 246N9 | 2456N1 |
| 10-(C)5 | .235 | .278 | | .246 |
| 10S5 | | | | .133 |
| 20-3 | .051 | .063 | .076 | .054 |
| 20-(C)3 | .117 | .146 | .174 | .125 |
| 20S3 | | | .066 | |
| 20-5 | .054 | .070 | .085 | .058 |
| 20-(C)5 | .062 | .080 | .098 | .066 |
| 20S5 | | | .054 | |
| 3φ-4 | .078 | .092 | | .082 |
| 40-1 | .034 | .044 | .054 | .037 |
| 40S1 | | | .102 | |
| 40-3 | .032 | .042 | .052 | .034 |
| 40S3 | | | .239 | |
| 40-6 | .095 | | | |
| 5-φ5 | .088 | | | |
| 60-3 | .155 | .186 | | .163 |

8. Liquid crystal eutectic mixtures consisting of at least one binary set of components selected from the six groups in claim 1.

9. A binary eutectic mixture of claim 8 wherein the components 20-3 and 20-(C)3 are mixed in mole fractions of approximately 0.32 and 0.68, respectively.

10. A binary eutectic mixture of claim 8 wherein the components 10S5 and 10-(C)5 are mixed in mole fractions of approximately 0.36 and 0.64, respectively.

11. A binary eutectic mixture of claim 8 wherein the components 20-5 and 40-3 are mixed in mole fractions of approximately 0.58 and 0.42, respectively.

* * * * *